(12) United States Patent  
Gupta

(10) Patent No.: US 12,444,230 B2  
(45) Date of Patent: Oct. 14, 2025

(54) SYSTEM AND METHOD FOR PROCESSING MEDIA FOR FACIAL MANIPULATION

(71) Applicant: Deep Media, Inc., Oakland, CA (US)

(72) Inventor: Rijul Gupta, Oakland, CA (US)

(73) Assignee: Deep Media Inc., Oakland, CA (US)

( * ) Notice: Subject to any disclaimer, the term of this patent is extended or adjusted under 35 U.S.C. 154(b) by 584 days.

(21) Appl. No.: 17/954,406

(22) Filed: Sep. 28, 2022

(65) Prior Publication Data

US 2023/0114980 A1 Apr. 13, 2023

Related U.S. Application Data

(60) Provisional application No. 63/250,459, filed on Sep. 30, 2021.

(51) Int. Cl.
*G06V 40/16* (2022.01)
*G06T 3/4092* (2024.01)
*G06T 5/50* (2006.01)

(52) U.S. Cl.
CPC .......... *G06V 40/167* (2022.01); *G06T 3/4092* (2013.01); *G06T 5/50* (2013.01); *G06V 40/165* (2022.01); *G06T 2207/30201* (2013.01)

(58) Field of Classification Search
CPC .... G06V 40/167; G06V 40/165; G06V 10/24; G06V 40/171; G06V 40/161; G06T 3/4092; G06T 5/50; G06T 2207/30201
See application file for complete search history.

(56) References Cited

U.S. PATENT DOCUMENTS 11,308,657 B1 * 4/2022 Berlin ................... G06N 3/04
12,106,216 B2 * 10/2024 Ciftci ................ G06F 18/2415

* cited by examiner

*Primary Examiner* — Phuoc Tran

(74) *Attorney, Agent, or Firm* — Nicholas Pfeifer; Smith & Hopen, P. A.

(57) ABSTRACT

A system and method of processing media for facial manipulation. Input frames are downscaled to a lower resolution and facial detection identifies a target face in each input frame. The location of the target face is determined in the downscaled frames and the locations are projected to the input frames based on the pixel differences between the frames. Facial landmark detection is then performed on a cropped image from the original input frame. The facial landmarks are used to adjust the orientation of the input frames so that the target face in each input frame is in a standard orientation. Facial landmark detection is again performed on the target face in each frame while in the standard orientation to produce more accurate landmarks. Facial manipulation can then be executed based on the landmarks in the aligned input images. The orientation of the images with the manipulated faces are then reverted.

20 Claims, 24 Drawing Sheets

SYSTEM AND METHOD FOR PROCESSING MEDIA FOR FACIAL MANIPULATION

CROSS-REFERENCE TO RELATED APPLICATIONS

This nonprovisional application claims priority to provisional application No. 63/250,459, entitled "SYSTEM AND METHOD FOR FACIAL PROCESSING," filed Sep. 30, 2021 by the same inventor(s).

BACKGROUND OF THE INVENTION

1. Field of the Invention

This invention relates, generally, to processing media. More specifically, it relates to media processing for facial manipulation.

2. Brief Description of the Prior Art

As technology continues to evolve, many systems and methods now rely on accurately detecting faces and facial landmark points. For example, deep learning and deepfake technology (aka, "synthetic media") requires accurate detection of faces and the accurate identification of facial landmarks. However, detecting faces and facial landmarks in videos can be a difficult and time consuming process prone to inaccuracies, especially when the video or image is provided in a higher resolution (e.g., a resolution of 1080p or greater).

Accordingly, what is needed is a system and method that can more economically, accurately, and precisely execute facial detection and facial landmark detection, especially on higher resolution media. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for system and method that can more economically, accurately, and precisely execute facial detection and facial landmark detection for facial manipulation is now met by a new, useful, and nonobvious invention.

The present invention is a system and method of processing media for facial manipulation. The novel steps include first acquiring a plurality of input frames. The input frames can be acquired first through the acquisition and then parsing of an input video.

The present invention initiates facial detection on each input frame. The facial detection includes, in response to identifying a face in an input frame, identifying a location of the detected face in the input frame. The present invention then bounds the detected faces in the input frames and crops the faces in the input frames.

Using the cropped input frames, the present invention identifies facial landmarks on the detected faces in each cropped input frame. After the facial landmarks are identified, the present invention identifies at least a target face across the cropped input frames and identifies a series of the plurality of input frames that includes the target face.

The present invention then crops and adjusts the orientation of the target faces in the series of input frames based on the identified facial landmarks detected in the cropped input frames, so that the target face in each of the series of input frames is in a standard orientation, thereby creating a plurality of aligned target crop frames. The standard orientation may include the target faces looking straight ahead in the center of the cropped input frame. In addition, the present invention may pad the target face in one or more of the input frames after the target face is in the standard orientation. Facial landmarks can then be detected on the target faces in each of the aligned target crop frames.

Using the facial landmarks in the aligned target crops, the present invention manipulates one or more facial features of the target face in one or more of the aligned target crop frames, thereby creating a plurality of synthetic target faces. Finally, the orientation of each of the synthetic target faces is reverted to an original orientation of each corresponding input frame. The reversion of the orientation of each of the synthetic target faces is based on measured movements of the facial landmarks of the target face between the corresponding input frame and aligned target crop frame.

The present invention can further include identifying the resolution of the input frames, identifying the required resolution of the input frames for facial detection and facial landmark detection, and reducing the resolution of each input frame to the required resolution or less than the required resolution, thereby creating a plurality of downscaled input frames. Additional steps include reducing the resolution of each input frame by a factor, thereby creating a plurality of downscaled input frames; executing the facial detection on each downscaled input frame, wherein the facial detection identifies at least one anchor point in a coordinate system of the downscaled input frame and the anchor point has identifiable coordinate values; multiplying coordinate values of the at least one anchor point by the factor, thereby creating at least one upscaled anchor point; and identifying a location of the target face in each input frame based on the upscaled anchor point for bounding the detected faces in the input frames.

The present invention can further incudes steps for padding each input frame and initiating facial detection on each padded input frame; cropping each input frame and initiating facial detection on each cropped input frame; and aggregating and recording facial detection data.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
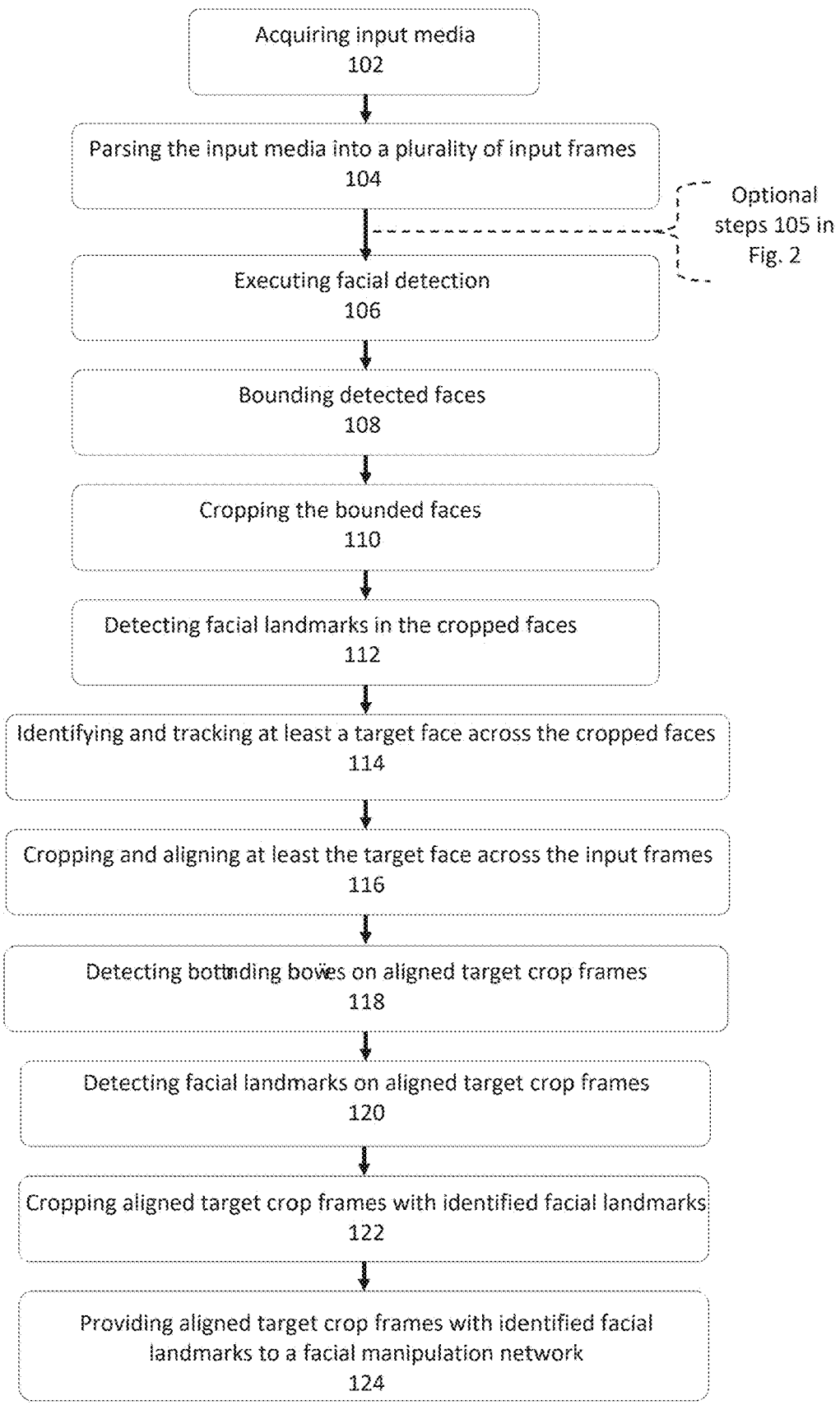
FIG. 1 is a flowchart of an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

Manipulation of videos and images may involve the manipulation of a single frame or group of frames from a first state to a second state. These videos and images in the first state are collectively referred to hereinafter as "input media." Similarly, the one or more frames from the input media are referred to hereinafter as "input frames."

Certain types of media processing/manipulation, especially facial manipulation, of the input media can be difficult, expensive/time consuming, inaccurate, and sometimes impossible. These issues often arise as a result of the high resolution of the input media, the object being occluded in the frame, the object being too close/cut off at parts in the frame, the object being too small/too far in the background, and/or the object being in an in-opportune orientation (e.g., upside down/at a 90° angle, etc.).

The present invention overcomes these problems through a series of unique and novel media processing steps. In some embodiments the present invention includes a system configured to perform the series of media processing steps through one or more computer systems. The method of executing the media processing steps is exemplified in the flowchart in FIG. 1.

Acquisition

Prior to executing the media processing steps, the present invention is configured to capture, receive, or retrieve input media at step 102. Capturing the input media may be performed using any video or image capturing device known to a person of ordinary skill in the art, including but not limited to cameras and video recorders. The input media may be received, wirelessly or via wire(s), from any recording device or from any data transferring method known to a person of ordinary skill in the art. Likewise, the input media may be retrieved, wirelessly or via wire(s), from any data store known to a person of ordinary skill in the art using one or more networks known to a person of ordinary skill in the art.

Parsing into Frames

Figure 16:
FIG. 16 is an exemplary input frame.

If the input media is in the form of a video, the present invention parses the video into a plurality of input frames at step 104. The step of parsing the frames may be achieved using known systems and methods for converting videos into still frames. An exemplary input frame is depicted in FIG. 16.

Identification of Resolution and Reduction of Resolution

Figure 4:
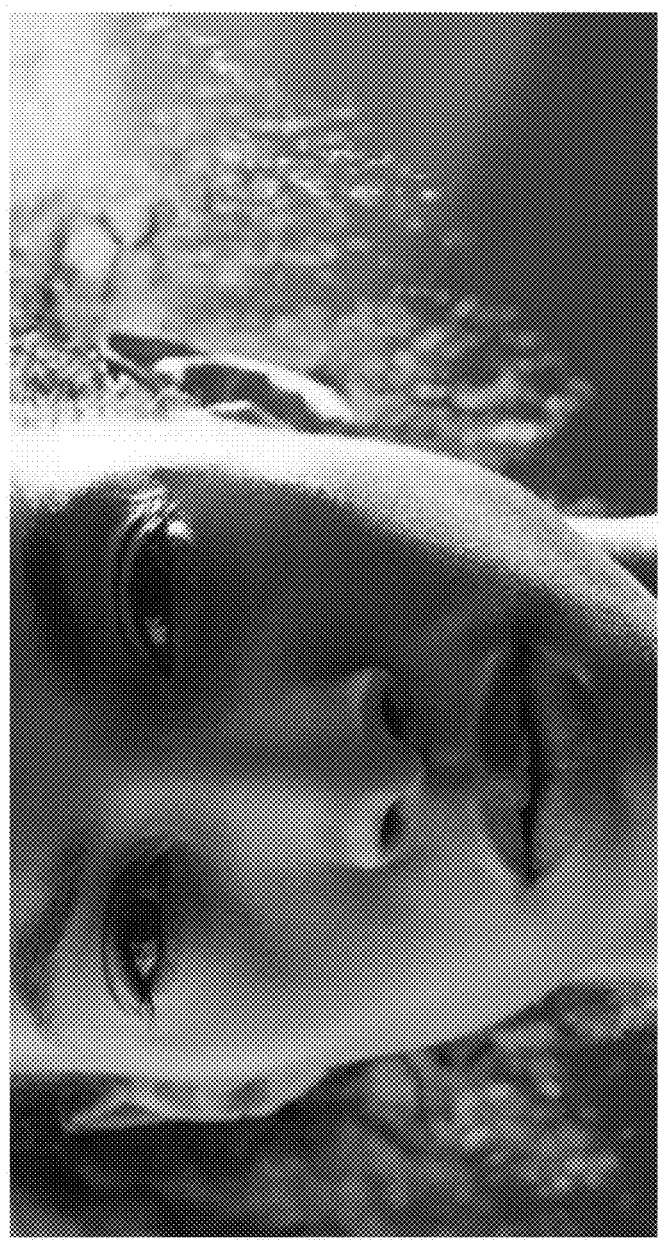
FIG. 4 is an exemplary input frame.
Figure 5:
FIG. 5 is a downscaled version of FIG. 4.
Figure 9:
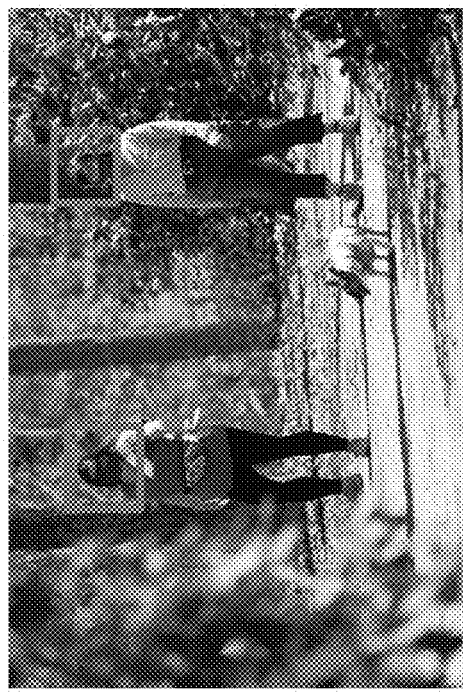
FIG. 9 is a downscaled version of FIG. 8.
Figure 13:
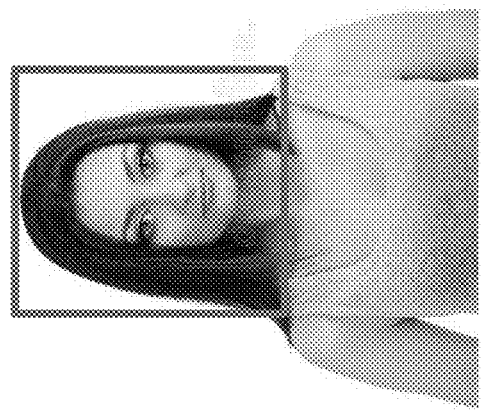
FIG. 13 is a downscaled version of FIG. 12 with a bounding box around a detected face.

In many instances, the input frames have a resolution equal to or above 1080p, e.g., 4K as exemplified in FIG. 4. However, facial detection on high resolution (i.e., greater than 1080p) can be inaccurate, slow, and sometimes impossible depending on the facial detector. In addition, landmark detection on a series of high-resolution frames can be slow and inaccurate depending on the facial landmark detector. If low resolution is required for the facial detector and/or landmark detector or it is desirous to increase the speed of facial detection and facial landmark detection, the present invention includes additional steps 105 in FIG. 2. At step 105a, the present invention identifies the resolution of the input frames and at step 105b, the required resolution of the input frames for the facial detector and landmark detector is identified. Knowing the resolution of the input frames and the required resolution of the input frames for the facial detector and landmark detector, the system can then reduce the resolution (i.e., downscale the resolution as exemplified in FIGS. 5, 9 and 13) of the input frames to a required resolution, e.g., 720p. The resultant input frames are referred to as a "downscaled input frames."

Figure 2:
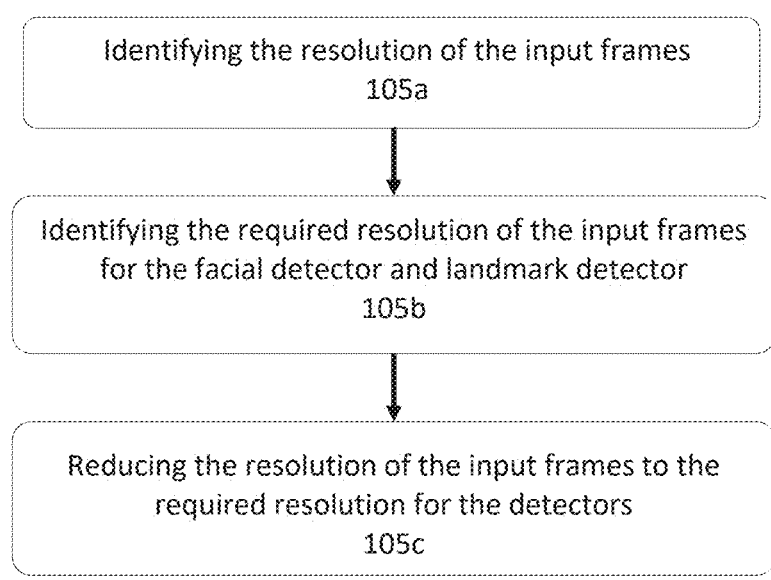
FIG. 2 is a flowchart of additional steps.

It should be noted that the facial detector and the facial landmark detector can be systems or networks (e.g., neural networks) incorporating artificial intelligence/machine learning/deep learning approaches to execute one or more tasks. Some of these systems are configured in such a way that they operate best on low resolution input frames and are prone to errors and/or substantially slower when they receive high resolution input frames. For example, FAN requires input frame having a resolution of 720 pixels in height and 1280 width (720p) in order to accurately and efficiently perform the tasks of detecting faces and identifying facial landmarks. That being said, there are alternative facial detectors and the facial landmark detectors, e.g., 3DDFA_V2, HRNet that can accurately and efficiently operate on higher resolution input frames (e.g., 1080, 4K, etc.) and usage of those detectors negates the need to downscale the input frames. As a result, steps 105 in FIG. 2 are optional depending on the facial detectors and the facial landmark detectors.

Once the difference in resolution is determined between the input frames and the required resolution of the detectors, the present invention reduces the resolution of the input frames to the required resolution for the detectors at steps 105c. Reduction to input frames may be achieved through any methods known to a person of ordinary skill in the art. For example, nearest-neighbor interpolation, bilinear interpolation, resampling using pixel area relation, or Lanczos interpolation over 8×8 pixel neighborhood.

Input Frame Facial Detection

For each input frame, the present invention executes facial detection at step 106 to determine if a face is present in each input frame. The facial detection step can be executed by a facial detector. As previously noted, the facial detector can be a system or neural network (NN) (e.g., a convolutional neural network or a multi-task cascade convolutional neural network) incorporating artificial intelligence/machine learning/deep learning approaches to identify whether an input frame includes one or more faces. In addition, the facial detector can be a trained system, which learned on training data how to identify a face within an image. Nonlimiting examples of a NN facial detectors include Dlib, 3DDFA_V2, MediaPipe, HRNet.

The system of the present invention sends each of the input frames (can be the original input frames or the downscaled input frames if downscaling is required) to the facial detector. The facial detector then identifies faces in the plurality of input frames and surrounds each face in a bounding box at step 106, which is also exemplified in FIGS. 5, 9, and 13.

The faces in each input frame are not always front and center and unobstructed. In addition, faces are sometimes cutoff at the visible edge of input frames. While existing AI facial detectors are well trained, they can struggle to properly identify a face that is partially obstructed, cut off by the edge of the input frame, or in the background. Thus, the present invention also includes additional steps for modifying the input frames to overcome these problems. These additional steps are discussed below and in reference to FIG. 3, which is an expanded flowchart for the facial detection step 106.

Padding Input Frame

Figure 6:
FIG. 6 is an exemplary downscaled input frame with padding.
Figure 10:
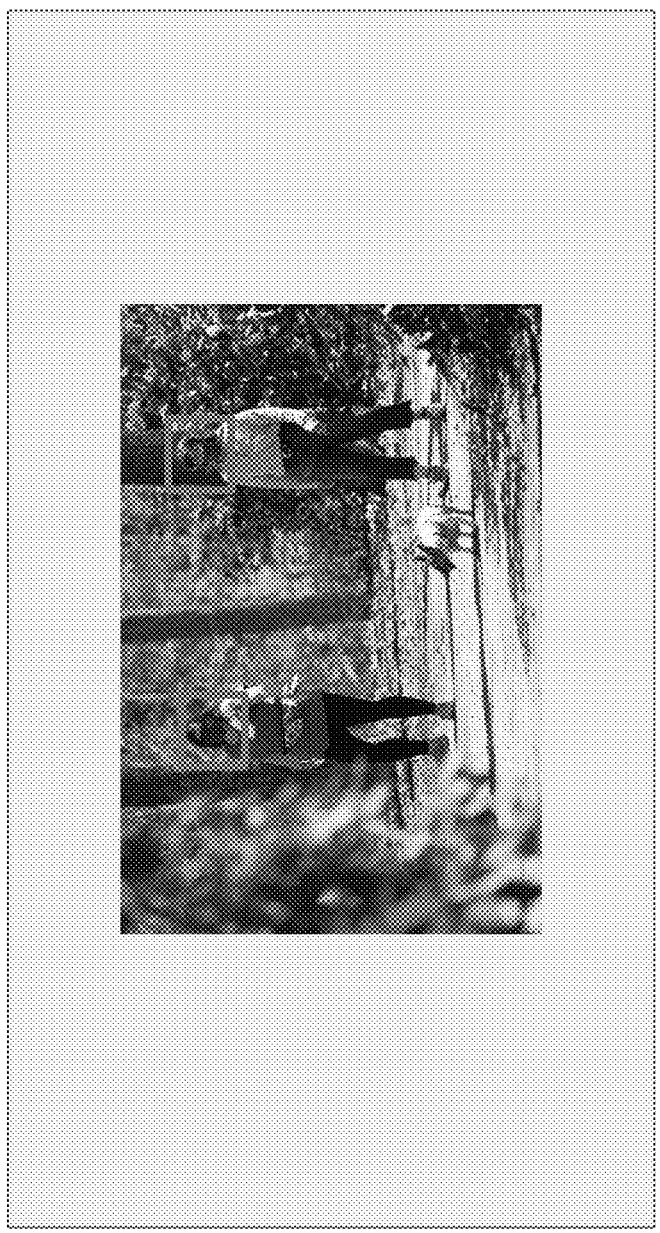
FIG. 10 is an exemplary downscaled input frame with padding and bounding boxes.

One additional step 106b for addressing input frames in which a face is cut off by the edge of an input frame or bounding box is padding the input frames. Padding is a process for adding in additional pixels to the input frames or portion of the input frame within the bounding box. FIGS. 6 and 10 provide examples in which the system pads the bounding boxes in comparison to FIGS. 5 and 10, respectively.

Figure 15:
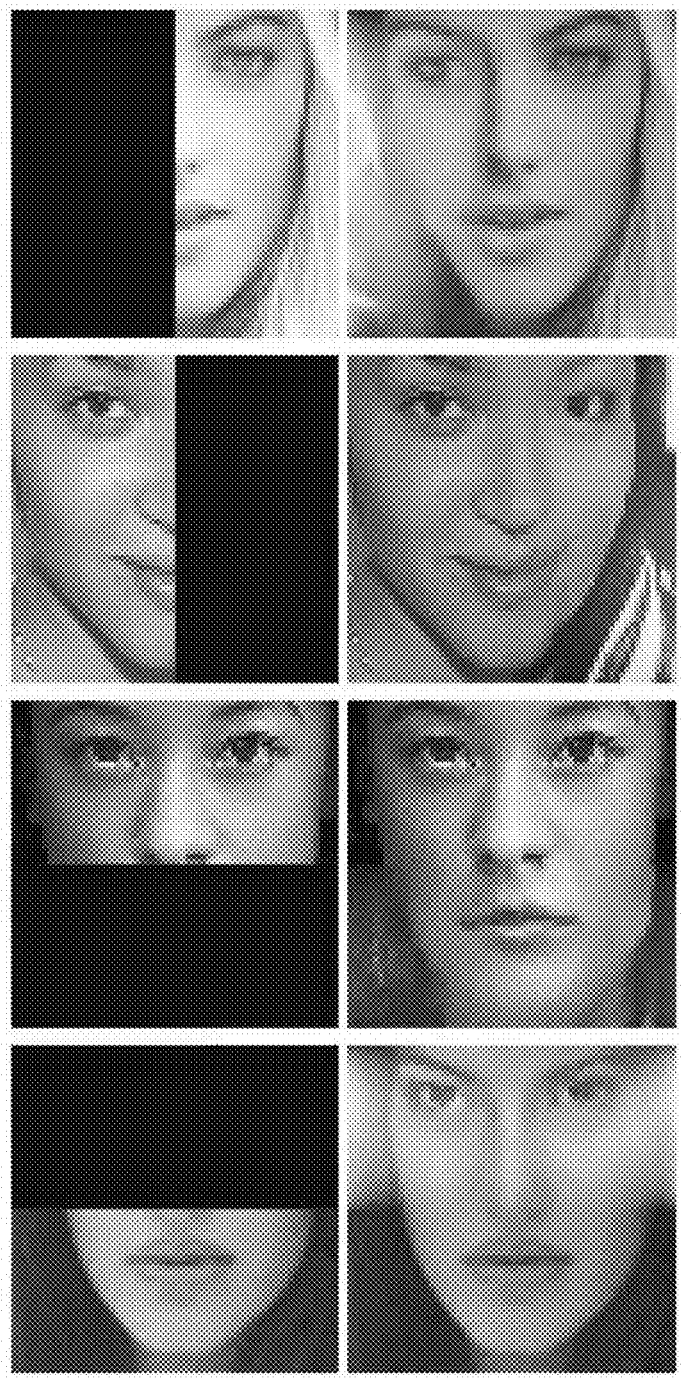
FIG. 15 is a collage of low resolution images showing a series of partial faces on the left side of the collage of images with GAN-padded faces shown on the right side of the collage of images.

Padding techniques may include but are not limited to adding pixels of a solid colored background or some other color/gradient/noise etc., copying the edge-pixels (such as through OpenCV), using a GAN-based system such as in-painting, edge-extension, StyleGAN2 embedding, etc. to create pixels with synthetic content. Examples of GAN-padding are captured in FIG. 15. As provided therein, a GAN-based padding is executed on each of the low resolution faces that are partially cutoff on the left side of the collage of images. The GAN-based padding includes synthetically creating the cutoff portion of the face to produce a whole face as shown on the right side of the collage of images.

Padding can include adding up to 100% additional pixels to each input frame and can be performed iteratively by NN systems. The padding may include equilaterally distributing the padding pixels around each input frame or may be adjustably distributed about the perimeter of each input frame.

The padding step can be performed prior to initiating the facial detector. However, the padding step can be part of an additional round of facial detection as exemplified in FIG. 3.

More specifically, the present invention can first execute facial detection on the original or downscaled input frames at step 106*a*, and then the input frames can be padded at step 106*b* and the system again executes a facial detection step to identify faces in each of the padded input frames in step 106*c*.

When the input frames need to be downscaled, padding of the input frame may occur before or after resizing, as long as the final padded image does not exceed the size threshold (e.g., 720). If the padded input frame exceeds the size threshold, then the padded input frame is again downscaled to the correct resolution.

Padding step 106*b* can be performed by using any known methods and systems for padding images. The present invention, however, can employ an AI system configured to execute both the padding and facial detection.

At this point, the system can aggregate the facial detection data from the original or downscaled input frames and the padded input frames. The system can also continue on to the additional step 106*d* to further increase efficacy of facial detection.

Cropping Input Frame

Figure 7:
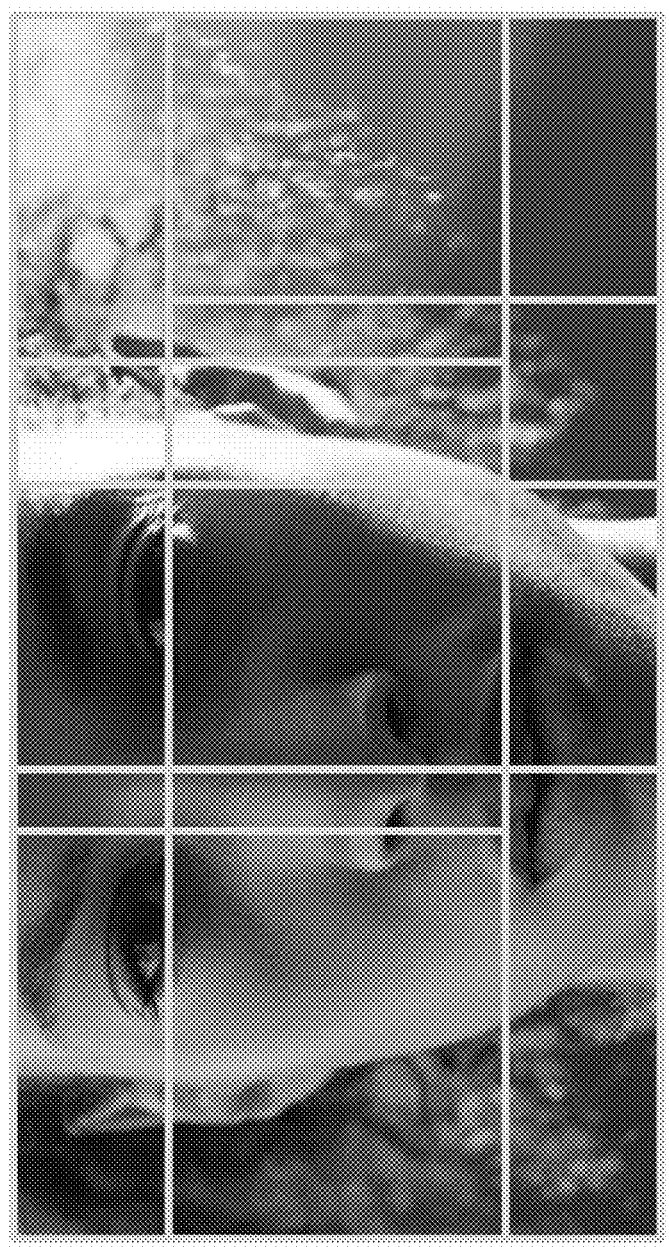
FIG. 7 is an illustration as to why cropping the original input frame doesn't help.
Figure 8:
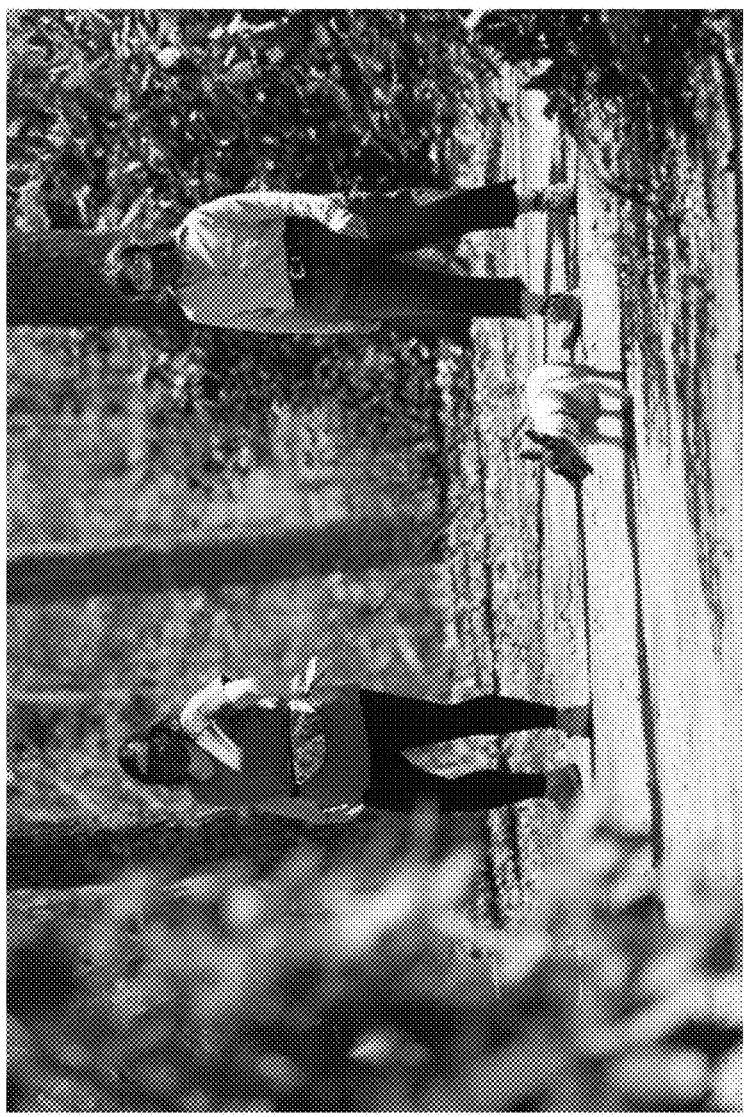
FIG. 8 is an exemplary input frame.
Figure 11:
FIG. 11 is an illustration as to why cropping helps with this particular input frame.
Figure 12:
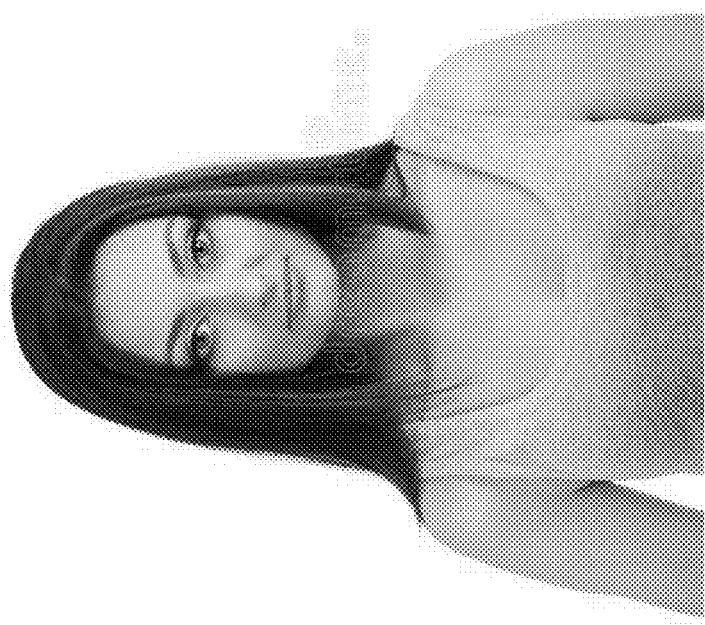
FIG. 12 is an exemplary input frame.
Figure 14:
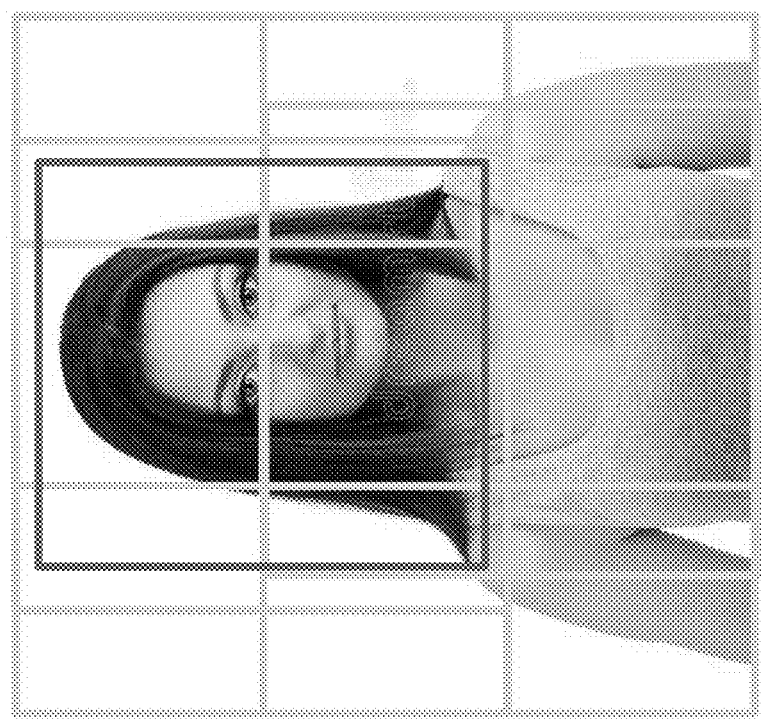
FIG. 14 is an illustration as to why cropping helps with this particular input frame.

Another additional step for facial detection is cropping the input frame. While cropping is not always helpful as depicted in FIG. 7, some frames includes faces appearing further in the background as shown in FIG. 8. Facial detectors sometimes struggle with identifying faces appearing more towards the background of an image. However, cropping the frame can improve the accuracy of the facial detector by narrowing the scope of focus into smaller sections of the frame as exemplified in FIGS. 11 and 14. In addition, cropping the frame from its original resolution as shown in FIG. 14 can allow the system to bypass any need to reduce the resolution.

The input frame is cropped in a predetermined manner. One such example is to crop the input frame into 9 overlapping frames comprised of 3 rows and 3 columns. When the input frame is cropped, the facial detector analyzes each cropped frame independently, which improves the accuracy of the facial detector.

Figure 3:
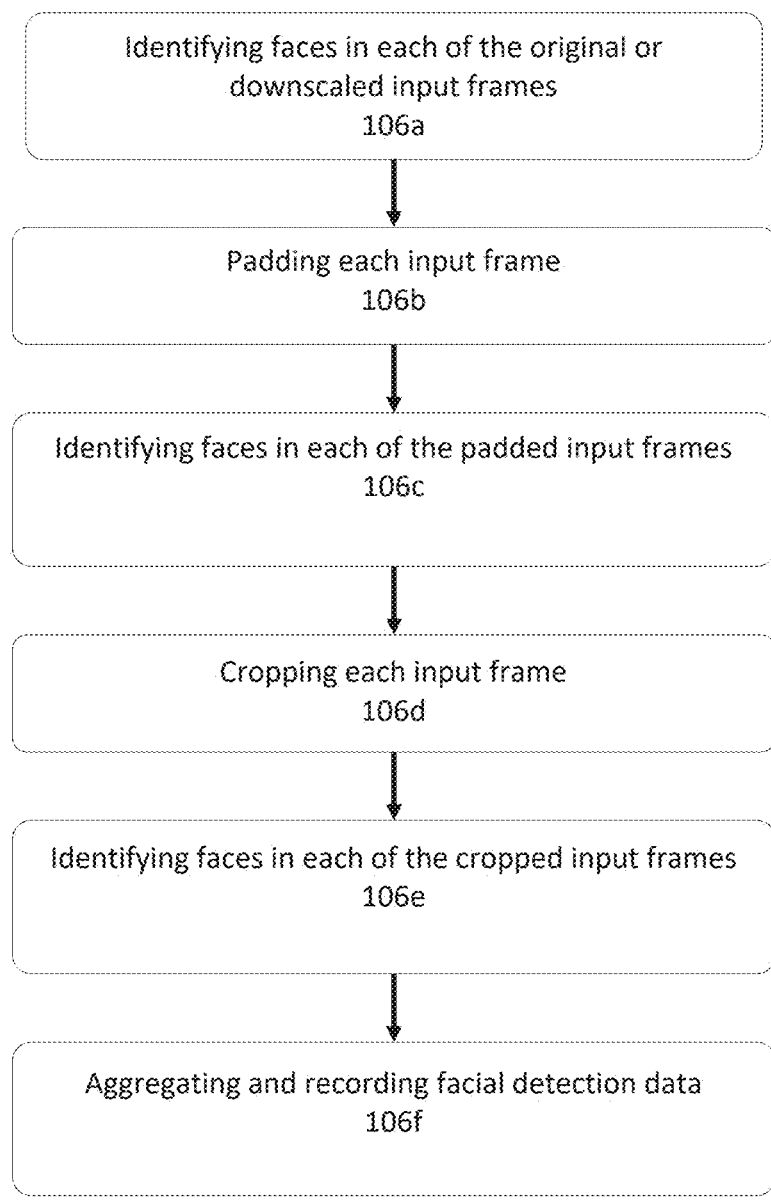
FIG. 3 a flowchart of additional steps.

As exemplified in FIG. 3 cropping occurs after at step 106*d*. Cropping can be performed after padding, i.e., the padded input frame is cropped. Alternatively, the cropping step can be performed on the original or downscaled input frames if padding does not occur. In other words, cropping may be performed on the original frame, the resized frame, and/or the padded resized frame.

Cropping step 106*d* can be performed by using any known methods and systems for cropping images. The present invention, however, can employ an AI/ML/GAN system configured to execute both the cropping and facial detection.

After the frames have been cropped, they are again run through the facial detector to identify faces in each cropped input frame at step 106*e*. The identified faces from steps 106*a*, 106*c*, and 106*e* are then aggregated and each face in each frame is recorded at step 106*f*. In some instances, multiple detections may need to be combined using an intersection over union (IOU) overlap and may also include facial detection, facial similarity, landmark comparison, etc.

Each of the facial detection steps can occur in accordance with the sequence shown in FIG. 3. However, steps 106*d* and 106*e* can occur prior to 106*b* and 106*c*. In addition, the system can opt to forego the facial detection steps 106*a* and 106*c* and instead run the facial detection in step 106*e* after the input frame has been padded and/or cropped.

Bounding Box

The present invention also includes step 108 for creating bounding boxes around at least a portion of the faces detected in the input frames. The bounding boxes are executed using any known systems and methods configured to create or at least identify a boundary around the detected faces. The bounding box step can be executed by a NN incorporating artificial intelligence/machine learning/deep learning approaches to identify whether an input frame includes one or more faces. In addition, the NN can be a trained system, which learned on training data how to identify and bound a face within an image. Nonlimiting examples of these NNs include Dlib, FaceBoxes (3DDFA_V2 uses FaceBoxes), etc. In addition, while the term "bounding box" suggests that the boundary is a rectangular shape and if often in fact a rectangular shape, alternative shapes can be used to establish a boundary around the detected faces in the original, downscaled, padded, and/or cropped input frames.

Depending on the facial detection software, a certain percentage of the area of bounding box is attributed to the detected face. Typically, the detected face occupies around 90% of the bounding box.

The bounding boxes help establish the location of the detected faces in the input frames. Each bounding box has an identifiable location on the modified/downscaled input frame based on one or more anchor points (e.g., one or more of the four corners of the box). Typically, the identifiable location of the bounding box is based on a defined coordinate system for the input frame in whatever version of the input frame that is in use (e.g., original, downscaled, padded, and/or cropped). An exemplary coordinate system is an X-Y coordinate system in which the upper left corner of the image is the 0-0 pixel location. However, any coordinate system known to a person of ordinary skill in the art may be used.

In addition, while the bounding box is typically a rectangular shape having four identifiable corners, the bounding box may be any identifiable reference object or point for identifying and tracking the location of a detected face. Regardless of the shape of bounding box, the location of the boundary box is conveyed via one or more anchor points and/or the size of each side of the boundary box.

The present invention uses the location of the anchor points in the modified image (i.e., the resized and/or cropped and/or padded image) and re-calculates the X-Y values of those anchor points in the original input frame. For example, if the input frame is 4K, it has 4 times as many pixels as a downscaled input frame with a resolution of 720p in the X direction and 4 times as many pixels in the Y direction. Thus, the coordinate values of the anchor points would be multiplied by 4 and increased by 2 to provide the appropriate coordinate points for the bounding box on the original input frame in 4K. So, if the bounding box on the downscaled input frame has anchor points of 10-20, 10-30, 20-20, and 20-30, the anchor points of the upscaled bounding box would become 42-82, 42-122, 82-82, 82-122.

If the bounding box detector came from a cropped image, then the location of the crop will be factored into account. Similarly padding will be factored into account. In the event of padding, additional padding onto the original image can be added to best match the location of the bound box.

A bounding box is then precisely located on the original input frame according to the upscaled anchor points. The result is the bounding box positioned in an identical location relative to the target face in both the original input frame and the modified input frame.

Facial Landmark Detection

Referring back to FIG. 1, the present invention then crops the input frames to capture the bounded faces on the input frames at step 110. Again, the cropping step can be performed using known methods and systems for cropping images as described above. The system does not necessarily crop the bounded face in a manner to remove all other content from the image. Rather, the system uses the pixels residing within the bounding box to execute the facial landmarks analysis. The pixels outside of the bounding box can be removed or can simply be ignored in the cropping step 110.

Figure 17:
FIG. 17 is a cropped frame of the face detected in the input frame of FIG. 16.

The cropped images or more simply put, the bounded pixel are then assessed through facial landmark detection software at step 112. Facial landmarks are detected on each of the cropped faces as exemplified in FIG. 17. Facial landmark detection may be performed using any software configured to detect landmarks points on a face. The facial landmark detector can be a NN incorporating artificial intelligence/machine learning/deep learning approaches to identify facial landmark points on one or more faces. In addition, the NN can be a trained system, which learned on training data how to identify and locate facial landmark points. Nonlimiting examples of these NNs include Dlib, 3DDFA_V2, HRNet, FAN, etc.

Many landmark detection algorithms still operate at a maximum input size such as 160 pixels, 256 pixels, and 384 pixels. Due to the preprocessing steps described above, the system is able to utilize recent developments in high-resolution facial landmark detection such as HRNets, Attention-Driving Cropping, etc. These networks may be modified to generate landmarks at 468 pt or 30 Kpt, moving beyond the standard low-landmark implementations of 5 pt, 51 pt, 68 pt, etc. Landmarks that aren't run using a high-resolution setup are upscaled using known methods for upscaling resolution.

Facial landmark detection is used to help identify the same face across multiple input frames. To do so, the present invention also employs facial trajectory analysis based on movement of the facial landmarks between frames. Trajectory analysis can be performed known system and methods, such as UniTrack, configured to identify and track the same face through multiple frames. In addition, the analysis can be executed by a NN incorporating artificial intelligence/machine learning/deep learning approaches to identify and track faces and/or facial landmark points on one or more faces between multiple frames. In addition, the NN can be a trained system, which learned on training data how to execute facial trajectory analysis.

Trajectory analysis may consider (1) face ID loss, i.e., facial similarity loss which is performed by a trained AI system (FaceNet, OpenFace, ArcNet, SFace), (2) relative locations of the landmark points, and/or (3) the location of the face in each adjacent frame. In some embodiments, trajectory analysis considers the location of the face on the frame and the facial landmark similarities to determine whether two or more faces in different frames are the same face.

Facial landmark detection and tracking across frames is particularly important when tracking a target face across multiple input frames in the media file. A "target face" is a term used to differentiate a face of interest from other background faces. The target face is of the same individual across multiple frames or images. Typically, the target face is of particular importance for the media manipulation. The steps herein can be performed on input frames including the target face or can be used on all input frames containing any faces.

After identifying the facial landmarks on one or more faces across the various cropped faces the system can identify and track the same face across the different frames at step 114. The following steps are conducted in reference to a target face, but can be performed for more than one individual's face or every individual's face.

To account for the locational inaccuracies of the various landmark points, some embodiments of the system execute steps for facial landmark smoothing. Facial landmark smoothing includes identifying an average location of a particular landmark point relative to the target face. By averaging the location of each landmark point across various cropped images of the target face, the system is able to identify the locations of the landmark points more accurately on the target face. The averaging may be performed using any method known to a person of ordinary skill in the art for averaging a location of various points, including but not limited to Euclidean measurements.

Cropping and Aligning Target Faces

Figure 18:
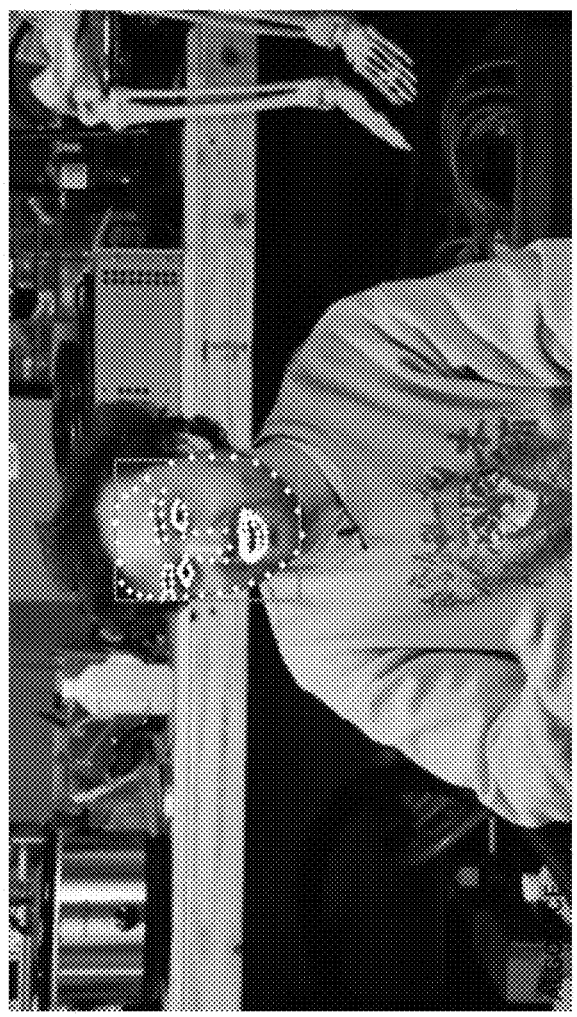
FIG. 18 is an illustration of the facial landmarks detected in FIG. 17.
Figure 19:
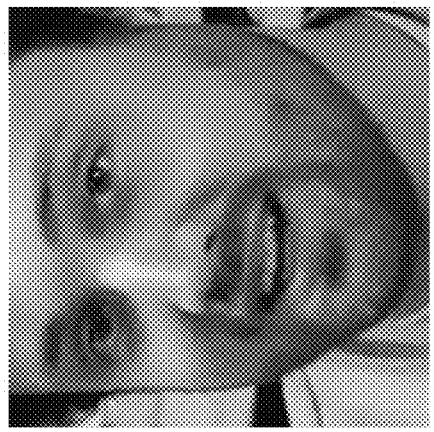
FIG. 19 is an exemplary aligned target crop frame of FIG. 17.

At this point, the target face is identified and located throughout the input frames via the bounding boxes and the facial landmark points for the target face are known in each input frame (see FIG. 18, which depicts the bounding box and landmarks on a target face in an input frame). The present invention then crops the target faces from the original input frames using the bounding boxes and digitally aligns the cropped target faces so that the target faces are all rotated and facing the same general direction at step 116 to create a series of cropped frames in which the target faces are all in the same orientation (referred to as "aligned target crop frames"). An exemplary aligned target crop frame is depicted in FIG. 19.

The cropping and aligning step can be executed by a cropping and alignment module ("CA module"). The CA module can be an affine transformation such as a simple image rotation of a certain angle based on the angle made between the target face's eyes. Additionally, the CA module may use an affine transformation that includes rotation, translation, scale transformations, or other linear transformations executed by remapping certain facial landmark points or anchor points to a desired location.

In performing the cropping step, the system relies on the identified location of the bounding boxes for each of the target faces in each of the input frames as determined in previous steps. The cropping step can further include the following steps for each input frame: analyzing the location of the facial landmark points within the bounding box in each input frame and determining the required degree of rotation/reorientation to determine where the facial landmark points will end up within the bounding box after the target face is aligned. The additional steps include adjusting the size of the bounding box or size of certain sides of the bounding box to ensure that the target face will reside within the bounding box when aligned. The size adjustment can be as an overlay with respect to the original input frame or can be in the form of padding the frame after cropping. Furthermore, these additional steps can be performed on each input frame independently resulting in the aligned target crop frames having different sizes form one frame to another based on the required adjustments.

With respect to the alignment portion of this step, the present invention relies on the facial landmark points in each frame and/or smoothed facial landmark points in each frame. Using the landmark points, the present invention adjusts the orientation of the target face in each input frame so that the faces are all oriented in a standard orientation.

The present invention can use a plurality of landmark points on the target face to execute the aligning step. In one example, the plurality of points includes the center of the nose, center of both eyes, and both sides of the mouth. The target face in each frame is rotated as needed so that the points are all in a similar location from one frame to another. For example, the target faces across the frames could be adjusted so that the line extending between the center points of the eyes is horizontal across all frames.

A standard orientation may be a predetermined orientation in which the target face is centered and rotated so that the face is generally oriented to face perpendicular to the frame, i.e., the face is looking straight ahead.

In order to ensure that each aligned face is centered in each cropped frame, the aligned target crop frames can be independently padded as needed to relocate the aligned target faces in the center of the aligned target crop frames. The padding steps can be performed similar to the previously described padding steps.

The extent of any alignment/orientation is recorded for each input frame. The recorded data may include rotational or linear movement within two or three dimensions and is based on the detected facial landmarks and/or the coordinate system of the image. It may be recorded as a "homography" and/or transformation matrix. These recorded parameters are used later in subsequent steps.

The cropping and aligning step 116 may be padded and/or cropped so that the target face is aligned with the center of the frame and so that the entire target face including the bottom of the chin and all facial extremities such as ears and forehead are fully present in the image. For example, the target face can take up roughly 20% of the entire frame width (e.g., form left jaw to right jaw). In some embodiments, the aligned frame of the target face is cropped so that the target face occupies 90% of the cropped image.

Facial Landmark Detection on Aligned Target Crop Frames

Figure 20:
FIG. 20 is an illustration of the bounding box and facial landmarks of the aligned target crop frame of FIG. 19.

As previously explained, the system crop-aligns once with the entire target face in the image, using e.g., FFHQ-align-big at step 116. The entire target face is centered and aligned and in the original resolution in the resulting aligned target crop frames. Moreover, because the target faces are all in the same standard alignment and centered, the facial landmarks are more consistent across the various images. The system detects facial landmarks on the aligned target crop frame at steps 118 as depicted in FIG. 20. These more accurate facial landmarks allow the system to bound and crop from the FFHQ-align-big images.

Facial landmark detection is performed using any known systems, networks, or techniques, such as those described herein, to generate landmarks in high-resolution. Off-the-shelf tools may be modified to operate in 468 and/or 30K+in 2D and/or 3D. But even if the system doesn't use high-resolution landmarks, normal landmark detectors will be better because of the alignment and padding steps.

To account for the locational inaccuracies of the various landmark points, some embodiments of the system execute steps for facial landmark smoothing. Facial landmark smoothing includes identifying an average location of a particular landmark point relative to the target face. By averaging the location of each landmark point across various cropped images of the target face, the system is able to identify the locations of the landmark points more accurately on the target face. The averaging may be performed using any method known to a person of ordinary skill in the art for averaging a location of various points, including but not limited to Euclidean measurements.

Bounding and Cropping Aligned Target Crop Frames

Figure 21:
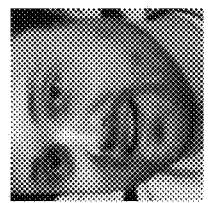
FIG. 21 is the cropped target face from FIG. 20.

After system detects facial landmarks on the aligned target crop frame at step 118, the target faces in the aligned target crop frames are bounded at step 120 based on the detected landmarks, which is also depicted in FIG. 20. The bounded pixels and landmarks are then cropped or simply provided to a facial manipulation network/system as shown in FIG. 21.

Facial Manipulation

At this point, the detected facial landmarks for each of the aligned target faces in each of the cropped images can be sent to a facial manipulation system at step 124 to create synthetic target faces, such as deep fakes. Facial manipulation systems may include AI/ML systems, such as GAN generators that are trained to manipulate one or more facial features of the target face or one or more features of the image.

The inputs to a GAN based system may be an image or a series of images that are cropped and may be aligned based on the requirements of the specific GAN-based system. The outputs of the GAN based system are synthetically manipulated versions of the input images. The synthetically manipulated images may have different features/characters such as new facial/mouth structures, altered facial hair, altered macro-features such as age/race/gender, etc. The inputs to the GAN-based system may also include additional information such as original features/characters or the relevant driving audio from the original video asset as related to the input image frames.

Following any manipulation to the target faces in their aligned orientations, the present invention can then revert each of the manipulated/synthetic target faces in the cropped image back to their original alignments/orientations in the input frames as long as the generated outputs maintain the alignment setup (e.g., the face is in the same place/orientation with the same padding around it). The recorded alignment/orientation data is used to revert the orientations of the synthetic target faces back to the original orientations of the original target faces in the input frames. Likewise, any padding is removed. As a result, the input frames are transformed to include synthetic target faces replacing the original target faces in the input frames. The input frames are recompiled into synthetic media with the synthetic target faces.

Facial manipulation may include, but is not limited to, lip-reanimation, facial-animation/re-animation, attribute manipulation (e.g., gender swap, age swap, etc.), virtual try-on, hair style change, makeup-transfer, etc. As a result of the facial processing steps described herein, the present invention is able to more quickly, accurately, and precisely manipulate facial data in high quality and high-resolution videos and images.

Two Stage Facial Manipulation

Figure 23:
FIG. 23 is the clean first stage synthetic target face from FIG. 22.
Figure 22:
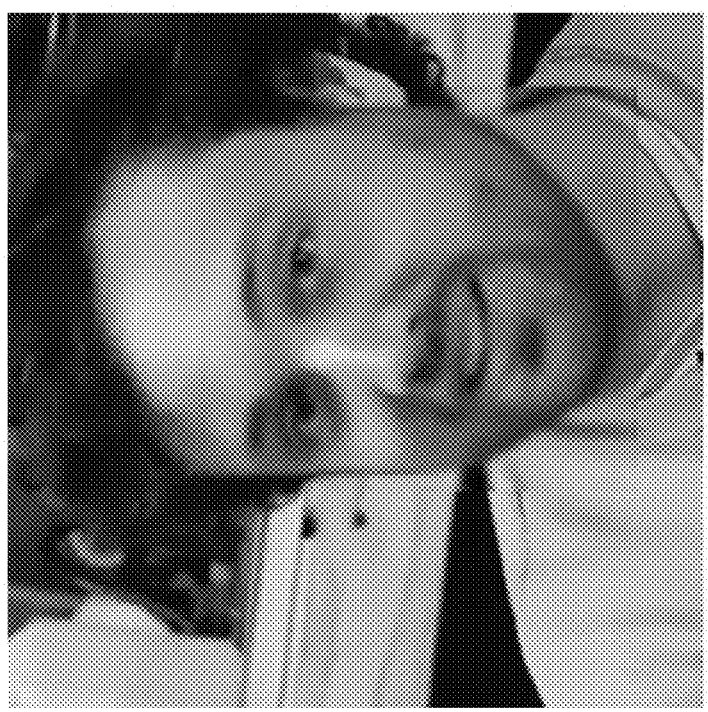
FIG. 22 is a synthetic target face overlaid on the aligned target crop frame of FIG. 19.

The present invention further includes inputting the aligned target crop frames and facial landmarks to a facial manipulation system, such as a GAN generator, having a first stage GAN generator and a second stage GAN generator. The first stage GAN generator executes facial manipulation to produce a synthetic target face. The synthetic target face is overlaid on the aligned target crop frame as shown in FIG. 22 to create a first stage synthetic target image as shown in FIG. 23. FIGS. 22 and 23 depict a synthetically modified lip and jaw in comparison to the input frames.

Figure 24:
FIG. 24 is a second stage synthetic target image.

At this point, the system executes the crop and align step 116 on the first stage synthetic target image with a "tighter"

bounding box, e.g., FFHQ-align-normal. The target face is reoriented as determined by a transformer, such as warpAffine, which uses linear transformation based on the facial landmark points to further improve the alignment of the target face. The additional crop-align produces an image better suited for the second-stage GAN, which is configured to receive outputs from FFHQ-align-normal. The second stage GAN receives the first stage synthetic target image from the first stage GAN and further manipulates the first stage synthetic target to produce a more realistic and higher quality synthetic image referred to as the second stage synthetic target image as depicted in FIG. 24.

Figure 25:
FIG. 25 is the second stage synthetic target image from FIG. 24 reinserted/overlaid onto the aligned target crop frame.
Figure 26:
FIG. 26 is an image of the second stage synthetic target image in the aligned target crop frame after reverted back to their original alignment/orientation from the input frame.

The second stage synthetic target image is reinserted/overlaid onto the aligned target crop frame as depicted in FIG. 25. The present invention then reverts each of the manipulated/synthetic target faces in the aligned target crop frame back to their original alignments/orientations in the input frames based on the recorded alignment/orientation data as depicted in FIG. 26. Likewise, any padding is removed. As a result, the input frames are transformed to include synthetic target faces replacing the original target faces in the input frames. The input frames are recompiled into synthetic media with the synthetic target faces.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of processing media for facial manipulation, comprising:
   receiving a plurality of input frames;
   initiating facial detection on each input frame, wherein the facial detection includes, in response to identifying a face in an input frame, identifying a location of the detected face in the input frame;
   bounding the detected faces in the input frames;
   cropping the bounded faces in the input frames;

identifying facial landmarks on the detected faces in each cropped input frame;

identifying at least a target face across the cropped input frames and identifying a series of the plurality of input frames that includes the target face;

cropping and adjusting the orientation of the target faces in the series of input frames based on the identified facial landmarks detected in the cropped input frames, so that the target face in each of the series of input frames is in a standard orientation, thereby creating a plurality of aligned target crop frames;

detecting facial landmarks on the target face in each of the aligned target crop frames;

manipulating one or more facial features of the target face in one or more of the aligned target crop frames, thereby creating a plurality of synthetic target faces;

reverting the orientation of each of the synthetic target faces to an original orientation of each corresponding input frame, wherein the reversion of the orientation of each of the synthetic target faces is based on measured movements of the facial landmarks of the target face between the corresponding input frame and aligned target crop frame.

2. The method of claim 1, further including:
identifying the resolution of the input frames;
identifying the required resolution of the input frames for facial detection and facial landmark detection; and
reducing the resolution of each input frame to the required resolution or less than the required resolution, thereby creating a plurality of downscaled input frames.

3. The method of claim 2, further including:
reducing the resolution of each input frame by a factor, thereby creating a plurality of downscaled input frames;
executing the facial detection on each downscaled input frame, wherein the facial detection identifies at least one anchor point in a coordinate system of the downscaled input frame and the anchor point has identifiable coordinate values;
multiplying coordinate values of the at least one anchor point by the factor, thereby creating at least one upscaled anchor point; and
identifying a location of the target face in each input frame based on the upscaled anchor point for bounding the detected faces in the input frames.

4. The method of claim 1, further including padding each input frame and initiating facial detection on each padded input frame.

5. The method of claim 1, further including cropping each input frame and initiating facial detection on each cropped input frame.

6. The method of claim 1, further including:
padding each input frame and initiating facial detection on each padded input frame;
cropping each input frame and initiating facial detection on each cropped input frame; and
aggregating and recording facial detection data.

7. The method of claim 1, wherein the standard orientation includes the target faces looking straight ahead in the center of the cropped input frame.

8. The method of claim 1, further including padding the target face in one or more of the input frames after the target face is in the standard orientation.

9. The method of claim 1, further including receiving an input video and parsing the input video into the plurality of input frames.

10. A system for facial processing, comprising one or more computer devices performing the following steps:
acquiring an input video;
parsing the input video into a plurality of input frames;
initiating facial detection on each input frame, wherein the facial detection includes, in response to identifying a face in an input frame, identifying a location of the detected face in the input frame;
bounding the detected faces in the input frames;
cropping the bounded faces in the input frames;
identifying facial landmarks on the detected faces in each cropped input frame;
identifying at least a target face across the cropped input frames and identifying a series of the plurality of input frames that includes the target face;
cropping and adjusting the orientation of the target faces in the series of input frames based on the identified facial landmarks detected in the cropped input frames, so that the target face in each of the series of input frames is in a standard orientation, thereby creating a plurality of aligned target crop frames;
detecting facial landmarks on the target face in each of the aligned target crop frames;
manipulating one or more facial features of the target face in one or more of the aligned target crop frames, thereby creating a plurality of synthetic target faces;
reverting the orientation of each of the synthetic target faces to an original orientation of each corresponding input frame, wherein the reversion of the orientation of each of the synthetic target faces is based on measured movements of the facial landmarks of the target face between the corresponding input frame and aligned target crop frame.

11. The system of claim 10, further executing the following steps:
identifying the resolution of the input frames;
identifying the required resolution of the input frames for facial detection and facial landmark detection; and
reducing the resolution of each input frame to the required resolution or less than the required resolution, thereby creating a plurality of downscaled input frames.

12. The system of claim 11, further executing the following steps:
reducing the resolution of each input frame by a factor, thereby creating a plurality of downscaled input frames;
executing the facial detection on each downscaled input frame, wherein the facial detection identifies at least one anchor point in a coordinate system of the downscaled input frame and the anchor point has identifiable coordinate values;
multiplying coordinate values of the at least one anchor point by the factor, thereby creating at least one upscaled anchor point; and
identifying a location of the target face in each input frame based on the upscaled anchor point for bounding the detected faces in the input frames.

13. The system of claim 10, further including a step of padding each input frame and initiating facial detection on each padded input frame.

14. The system of claim 10, further including a step of cropping each input frame and initiating facial detection on each cropped input frame.

15. The system of claim 10, further including steps of:
padding each input frame and initiating facial detection on each padded input frame;

cropping each input frame and initiating facial detection on each cropped input frame; and aggregating and recording facial detection data.

16. The system of claim 10, wherein the standard orientation includes the target faces looking straight ahead in the center of the cropped input frame.

17. The system of claim 10, further including a step of padding the target face in one or more of the input frames after the target face is in the standard orientation.

18. A method of processing media for facial manipulation, comprising:

receiving a plurality of input frames;

initiating facial detection on each input frame, wherein the facial detection includes, in response to identifying a face in an input frame, identifying a location of the detected face in the input frame;

bounding the detected faces in the input frames;

identifying facial landmarks on the bounded and detected faces in each cropped input frame;

identifying at least a target face across the cropped input frames and identifying a series of the plurality of input frames that includes the target face;

cropping and adjusting the orientation of the target faces in the series of input frames based on the identified facial landmarks detected in the cropped input frames, so that the target face in each of the series of input frames is in a standard orientation, thereby creating a plurality of aligned target crop frames;

detecting facial landmarks on the target face in each of the aligned target crop frames;

manipulating one or more facial features of the target face in one or more of the aligned target crop frames using a first stage GAN generator, thereby creating a plurality of first stage synthetic target faces;

cropping and adjusting the orientation of the target faces in the plurality of first stage synthetic target faces and manipulating one or more facial features of the target face in one or more of the plurality of first stage synthetic target faces using a second stage GAN generator, thereby creating a plurality of second stage synthetic target faces;

reverting the orientation of each of the second stage synthetic target faces to an original orientation of each corresponding input frame, wherein the reversion of the orientation of each of the synthetic target faces is based on measured movements of the facial landmarks of the target faces between the corresponding input frames and aligned target crop frames.

19. The method of claim 18, further including:

padding each input frame and initiating facial detection on each padded input frame;

cropping each input frame and initiating facial detection on each cropped input frame; and aggregating and recording facial detection data.

20. The method of claim 18, further including receiving an input video and parsing the input video into the plurality of input frames.

* * * * *